(12) United States Patent
Krank et al.

(10) Patent No.: US 12,180,999 B2
(45) Date of Patent: Dec. 31, 2024

(54) SHAFT BEARING POINT AND SHAFT BEARING

(71) Applicant: Bayerische Motoren Werke Aktiengesellschaft, Munich (DE)

(72) Inventors: Benjamin Krank, Munich (DE); Matthias Lepschi, Munich (DE); Maximilian Rosenberger, Munich (DE); Thomas Spiess, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 87 days.

(21) Appl. No.: 18/028,655

(22) PCT Filed: Oct. 11, 2021

(86) PCT No.: PCT/EP2021/078040
§ 371 (c)(1),
(2) Date: Mar. 27, 2023

(87) PCT Pub. No.: WO2022/089928
PCT Pub. Date: May 5, 2022

(65) Prior Publication Data
US 2023/0332647 A1    Oct. 19, 2023

(30) Foreign Application Priority Data
Oct. 29, 2020   (DE) .................. 10 2020 128 402.0

(51) Int. Cl.
*F16C 19/06*  (2006.01)
*F16C 25/08*  (2006.01)
(Continued)

(52) U.S. Cl.
CPC ............ *F16C 33/66* (2013.01); *F16C 25/083* (2013.01); *F16C 33/7886* (2013.01);
(Continued)

(58) Field of Classification Search
CPC ........ F16C 19/06; F16C 25/083; F16C 33/66; F16C 33/6637; F16C 33/664;
(Continued)

(56) References Cited

U.S. PATENT DOCUMENTS

| 4,619,535 A | 10/1986 | Haugwitz |
| 2021/0054843 A1 | 2/2021 | Crochet |

FOREIGN PATENT DOCUMENTS

| DE | 1 039 802 A1 | 9/1958 |
| DE | 27 14 102 A1 | 10/1977 |

(Continued)

OTHER PUBLICATIONS

International Search Report (PCT/ISA/210) issued in PCT Application No. PCT/EP2021/078040 dated Dec. 22, 2021 with English translation (four (4) pages).

(Continued)

*Primary Examiner* — Phillip A Johnson
(74) *Attorney, Agent, or Firm* — Crowell & Moring LLP

(57) ABSTRACT

A shaft bearing point has a radial shaft bearing in which a drive shaft is rotatably supported relative to a machine housing. The radial shaft bearing is arranged directly or indirectly in a machine housing wall separating a lubricant space from a lubricant-free space. The radial shaft bearing has a lubricant side facing the lubricant space, and a seal side facing away from the lubricant space, in the axial direction, and a radial shaft seal is provided which is arranged at an axial distance to the seal side such that a lubricant chamber is produced between the seal side and the radial shaft seal ring in the axial direction. The lubricant chamber is equipped with a chamber separating wall. The chamber separating wall separates the lubricant chamber into a storage chamber, which is arranged between the seal side and the chamber separating wall, and a seal chamber, which is (Continued)

arranged between the chamber separating wall and the radial shaft seal ring. The storage chamber and the seal chamber are fluidically connected together via a separating wall throttle. The separating wall throttle has an annular gap as a fluid-conducting connection between the two chambers. The annular gap is formed between the chamber separating wall and the drive shaft and has a permeable height, which is greater than 0.1 mm and less than 3 mm, in the radial direction.

8 Claims, 3 Drawing Sheets

(51) Int. Cl.
    *F16C 33/66*     (2006.01)
    *F16C 33/78*     (2006.01)
    *F16C 35/077*     (2006.01)

(52) U.S. Cl.
    CPC ............ *F16C 35/077* (2013.01); *F16C 19/06* (2013.01); *F16C 2240/46* (2013.01); *F16C 2240/70* (2013.01)

(58) Field of Classification Search
    CPC .............. F16C 33/6674; F16C 33/7886; F16C 35/077; F16C 2229/00; F16C 2240/46; F16C 2240/70
    See application file for complete search history.

(56) References Cited

FOREIGN PATENT DOCUMENTS

| | | | |
|---|---|---|---|
| DE | 38 11 970 A1 | 10/1989 | |
| DE | 198 41 099 C1 | 11/2000 | |
| DE | 102015215462 A1 * | 2/2017 | |
| DE | 10 2016 106 996 A1 | 10/2017 | |
| DE | 102017129027 A1 * | 6/2019 | .............. F04C 29/00 |
| DE | 202019104108 U1 * | 12/2019 | ............ F16C 33/664 |
| FR | 3 078 748 A1 | 9/2019 | |

OTHER PUBLICATIONS

German-language Written Opinion (PCT/ISA/237) issued in PCT Application No. PCT/EP2021/078040 dated Dec. 22, 2021 (seven (7) pages).

German-language Search Report issued in German Application No. 10 2020 128 402.0 dated May 12, 2021 with partial English translation (11 pages).

* cited by examiner

SHAFT BEARING POINT AND SHAFT BEARING

BACKGROUND AND SUMMARY

The invention concerns a shaft bearing point with a seal device, and a shaft bearing with such a shaft bearing point.

The invention is presented below with reference to an electric drive machine in a motor vehicle, but this should not be regarded as a restriction of the invention to such an application. Often, an aluminum alloy is used as a housing material for an electric drive machine of a motor vehicle, in particular an electric motor/generator, and a steel material for the shaft or shafts; the same also applies to transmissions and other drive components. Because of temperature changes which are unavoidable during proper operation, and because of the different thermal expansion coefficients, different length changes of the components occur which must be absorbed by corresponding bearing concepts. Furthermore, in a motor vehicle, drive components are regularly lubricated with oil, so that shaft bearing points must be sealed with sealing rings. The temperature changes and differences may influence the sealing effect of the sealing ring. Furthermore, an increase in tension in the sealing ring improves its sealing effect and leads to a reduction in dependency on pressure conditions; however, this increased tension of the sealing ring against the shaft sealed therewith increases the friction level at the sealing point.

DE 198 41 099 C1 proposes a radial shaft seal wherein, to create a radial shaft sealing ring which allows pressure compensation between the space inside and the space outside the housing, without the escape of a fluid inside the housing, such as oil, from the housing interior, a splash guard is provided on the side facing the housing interior.

It is an object of the invention to provide a shaft bearing point with seal device with improved efficiency. This object is achieved by a device and by a shaft bearing with such a device in accordance with the independent claims. Preferred refinements of the invention are the subject of the dependent claims.

In the context of the invention, a shaft bearing point means a bearing point for rotatable mounting of a drive shaft relative to a housing component. The shaft bearing point has a radial shaft bearing in which the drive shaft is rotatably mounted relative to a machine housing. Preferably, the machine housing is configured as an electric motor/generator housing, and further preferably the machine housing accommodates an electric motor or electric motor/generator. The radial shaft bearing is in particular configured as a rolling bearing, preferably as a roller bearing or ball bearing, and particularly preferably as a deep-groove ball bearing. The radial shaft bearing is arranged directly or indirectly in a machine housing wall, i.e. a housing portion of said machine housing. The machine housing wall may be formed integrally with the machine housing or preferably configured as a separate bearing shield.

The machine housing wall separates a wet space, which may be called a lubricant space, from a lubricant-free space, a so-called dry space; in other words, the drive shaft passes through the machine housing wall from the lubricant space into the lubricant-free space. In the context of the invention, the lubricant space or wet space may be a region of the machine housing accommodating at least one component which is to be supplied for at least part of the time with a fluid, preferably a liquid lubricant, wherein such a component is in particular a roller bearing or gear wheel or similar. Preferably, the fluid received in the wet space is a lubricating oil, preferably a transmission oil. Further preferably, in the most general case, the dry space may also be the environment surrounding the machine housing; preferably, this lubricant-free space is a portion of the machine housing which accommodates electrically live parts of an electromechanical energy converter, preferably an electric motor/generator. In particular, fluid, in particular liquid lubricant, must be prevented from entering the dry space (lubricant-free space) from the wet space (lubricant space), since this may cause contamination or malfunctions there.

Furthermore, a radial shaft seal with at least one radial shaft sealing ring is provided for preventing the passage of fluid from the lubricant space into the lubricant-free space. The radial shaft bearing is inserted in the machine housing wall such that, with respect to an axial direction, i.e. a direction of a rotational axis of the drive shaft received in this radial shaft bearing, this has a side facing the lubricant space, a so-called lubricant side, and a side facing away from the lubricant space; in particular, this side of the radial shaft bearing faces the lubricant-free space and is known as the so-called seal side of the radial shaft bearing.

The proposed radial shaft seal is axially spaced from the seal side of the radial shaft bearing such that in the axial direction, a lubricant chamber is created between the seal side and the radial shaft sealing ring. Furthermore, it is proposed that a chamber partition wall is arranged in the lubricant chamber and divides the lubricant chamber, at least in regions, into two part chambers.

One of these part chambers is formed from the lubricant chamber by the chamber partition wall and may be regarded as a so-called bearing chamber, since it is arranged between the seal side of the radial shaft bearing and the chamber partition wall. The second of the two chambers formed from the lubricant chamber by the chamber partition wall may be regarded as a seal chamber, since this is arranged between the chamber partition wall and the radial shaft seal, in particular the radial shaft sealing ring.

The two part chambers (bearing chamber, seal chamber) formed from the lubricant chamber by means of the chamber partition wall are not hermetically separated from one another, but rather connected together fluid-conductively by means of a partition wall choke. The invention in particular thus proposes that pressures which build up in the bearing chamber, in particular by a pump action of the radial shaft bearing, do not act directly on the seal chamber (as would be the case without a chamber partition wall), but a pressure balancing takes place between the bearing chamber and the seal chamber via the partition wall choke.

The partition wall choke, which in particular is formed from the chamber partition wall and the drive shaft, has an annular gap for fluid-conductive connection between the bearing chamber and the seal chamber, said annular gap being formed between the chamber partition wall and the drive shaft. Furthermore, the annular gap is configured such that it has a fluid-throughflow height which is greater than 0.1 mm and less than 3 mm in the radial direction, i.e. orthogonally to the rotational axis of the drive shaft.

Tests have shown that, in particular, such a partition wall choke can firstly ensure that a sufficient quantity of lubricant can pass from the bearing chamber to the radial shaft seal to lubricate the contact between the radial shaft seal, in particular the radial shaft sealing ring, and the drive shaft during operation, and secondly the partition wall choke alleviates pressure fluctuations on the radial shaft seal, so that leaks in the direction of the lubricant-free space are prevented.

It is known from the prior art that if leaks occur at a radial shaft sealing ring, a radial shaft sealing ring with higher preload must be used so as to increase a normal force of the radial shaft sealing ring on the shaft to be sealed. This increased normal force leads not only to an improved sealing effect but also to a higher loss (friction level). In contrast, the proposed solution allows the same sealing effect to be achieved in different operating states by a reduction of pressure influences on the radial shaft seal with the same preload of a radial shaft sealing ring, in comparison with a radial shaft sealing ring with higher preload but without partition wall choke.

In a preferred embodiment of the invention, the radial shaft bearing is indirectly received in the machine housing wall, since the radial shaft bearing is received in a bearing pot which at least largely, or preferably completely, surrounds the radial shaft bearing. Preferably, the machine housing, and further preferably also the machine housing wall, comprises an aluminum alloy as a component or consists of such an alloy. Further preferably, the bearing pot comprises a steel material as a component or consists thereof. In particular in an application in which the radial shaft bearing is configured as a so-called movable bearing and is received with its bearing outer ring in the bearing seat so as to be displaceable relative thereto, a bearing pot of a steel material has a higher wear resistance than an aluminum alloy. By means of the bearing pot, it can be achieved that the bearing pot is received statically in the machine housing wall (steel/aluminum material pairing), and furthermore the movable bearing outer ring of the radial shaft bearing is received in the bearing pot (steel/steel material pairing), so that a relative movement, in particular in the axial direction, takes place between the material pairing of greater wear resistance. Further preferably, the chamber partition wall is formed integrally with said bearing pot. In particular, the chamber partition wall forms a shoulder for receiving forces in the axial direction, in particular insofar as the radial shaft bearing is loaded with axial forces on the bearing outer ring with a spring bearing device.

In a preferred embodiment of the invention, the chamber partition wall has a choke orifice radially opposite the drive shaft; expressed graphically, the chamber partition wall runs so close to the drive shaft in the radial direction, i.e. orthogonally to the rotational axis of the drive shaft, that a choke is formed between the chamber partition wall and the drive shaft. The chamber partition wall, or the end thereof facing the drive shaft, can accordingly be described as a choke orifice. Furthermore, this choke has a cross-section which is at least substantially formed as an annular gap. Furthermore, in the region directly opposite the drive shaft (in the context of the invention, this region of the chamber partition wall is designated the choke orifice), the chamber partition wall has an axial longitudinal extent which is greater than 0.25 mm and less than 5 mm. In particular, a small longitudinal extent leads to a lower fluidic friction between the chamber partition wall and the drive shaft on rotation thereof, and a long length of the choke orifice leads to an increase in its choking effect.

Tests have shown that a longitudinal extent from this range is firstly compatible with the installation space available, and secondly leads to a reduction in pressure pulsations in the seal chamber against the bearing chamber.

In a preferred embodiment of the invention, a spring bearing device is arranged in the axial direction between the seal side of the radial shaft bearing, preferably a bearing outer ring of the radial shaft bearing, and the chamber partition wall. Furthermore, the spring bearing device is configured such that by means of this, a bearing preload force can be applied in the axial direction onto an outer bearing ring of the radial shaft bearing. In particular, a preferably "low" preload on the radial shaft bearing can have a positive influence on its load-bearing capacity. Further preferably, despite this spring bearing device, the radial shaft bearing is displaceable in the axial direction relative to the machine housing wall, at least in a specific region, in particular until the spring bearing device is completely compressed (at block). Accordingly, for at least part of the time, the radial shaft bearing is displaceable in the axial direction relative to the housing wall. Insofar as the radial shaft bearing is received in the bearing pot and thus received not directly but indirectly in the machine housing wall, the radial shaft bearing is also displaceable relative to the bearing pot which is fixed in the machine housing wall.

In a preferred embodiment of the invention, the drive shaft has a drive shaft bearing diameter for receiving the radial shaft bearing, wherein this diameter of the drive shaft or region of the drive shaft may also be regarded as a so-called bearing seat. Furthermore, the drive shaft has a so-called drive shaft choke diameter opposite the chamber partition wall, wherein the drive shaft choke diameter means a diameter development, i.e. a region with outer diameter which changes in the axial direction (direction of the rotational axis of drive shaft). Preferably, this drive shaft choke diameter together with the choke orifice forms the annular gap for the partition wall choke. The drive shaft choke diameter, or outer diameter of the drive shaft in the region described above as the drive shaft choke diameter, is preferably smaller than the drive shaft bearing diameter. In particular, such an embodiment of the invention leads to an effective choke action so that pressure pulsations in the seal chamber are reduced.

In a preferred embodiment of the invention, the choke orifice has a choke orifice inner diameter through which the drive shaft is guided, in particular concentrically, forming the annular gap for the partition wall choke between the choke orifice and the drive shaft. Furthermore, the choke orifice inner diameter is selected from a diameter range relative to the drive shaft bearing diameter such that the choke orifice inner diameter is maximum 1 mm smaller than the drive shaft bearing diameter and maximum 1 mm larger than the drive shaft bearing diameter. In other words, the choke orifice inner diameter is selected from a range of +/−1 mm of the drive shaft bearing diameter. Tests have shown that with a choke orifice inner diameter corresponding approximately to the drive shaft bearing diameter (drive shaft bearing diameter+/−1 mm), a particularly compact structure can be achieved in the region of the lubricant chamber.

In a further embodiment of the invention, a bearing is proposed for the drive shaft, a so-called shaft bearing, wherein the drive shaft is mounted on at least two bearing points axially spaced from one another, and wherein at least one of these radial bearing points is configured as a shaft bearing point according to one of the above-mentioned embodiments of the invention.

In a preferred embodiment of the shaft bearing, one of the radial bearing points is configured as a so-called fixed bearing point. In the sense of the invention, a fixed bearing point means in particular that, in addition to the rotatable mounting of the drive shaft at this point, the drive shaft is fixed in the axial direction. In particular, by this axial fixing, the drive shaft is thus fixed in the axial direction at this fixed bearing point, and furthermore the second radial bearing point of the shaft bearing is configured as a shaft bearing point according to one of the above-mentioned embodiments of the invention. Such bearing arrangements are frequently described as fixed-movable bearings, wherein in the present case, the movable bearing side may be preloaded in the axial direction by means of a spring bearing device.

It is furthermore proposed that the fixed bearing point is arranged in the axial direction on the lubricant space side of the radial shaft bearing and axially spaced therefrom. Such an arrangement means that, on a temperature-induced expansion of the drive shaft relative to the machine housing, the choke effect of the partition wall choke changes, in particular if the drive shaft choke diameter is variable in the axial direction, i.e. diminishes starting from a maximum diameter, in particular the drive shaft bearing diameter, to a minimum diameter, in particular a drive shaft seal diameter (contact between radial shaft seal and drive shaft), wherein the reduction relates to the axial direction from the radial shaft bearing towards the radial shaft sealing ring. In particular, such an embodiment means that a "small" annular gap is formed at "high operating temperature" because in this state, the drive shaft has its maximum longitudinal extension. In this state, a "large" drive shaft choke diameter lies against the choke orifice inner diameter. If the operating temperature falls, the longitudinal extension of the drive shaft also reduces, and in such a case a smaller drive shaft choke diameter then lies against the choke orifice inner diameter than at the above-mentioned high operating temperature.

This changing size of the annular gap with operating temperature has a positive effect on the operating behavior of the shaft bearing, since at "high" operating temperature, a lubricant received in the wet space is less viscous than at "low" operating temperature. Because of the above-mentioned effect of the change in size of the annular gap of the partition wall choke, this through-flow annular gap is large at "low" operating temperature and small at "high" operating temperature. Such an embodiment of the invention has proved particularly reliable since the viscosity of the fluid in the wet space and the annular gap size develop in opposite directions, and thus firstly adequate lubrication of the radial shaft sealing ring is ensured with simultaneously small pressure pulsations in the seal chamber over a wide operating temperature range.

Individual features of the invention and embodiments thereof are explained in more detail with reference to the figures, wherein combinations of features other than those illustrated are in principle possible.

DETAILED DESCRIPTION OF THE DRAWINGS

Figure 1:
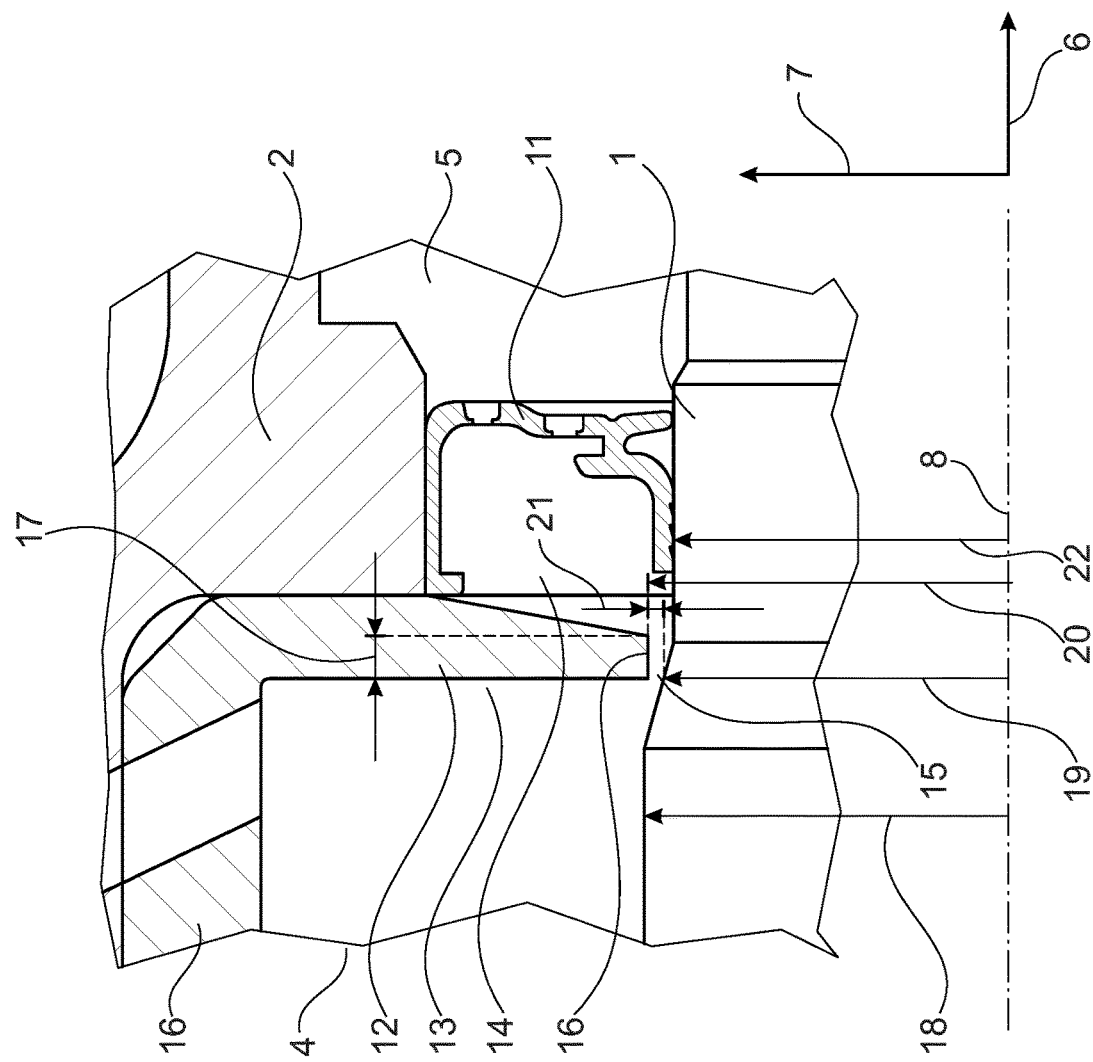
FIG. 1 is a part-sectional illustration (without radial shaft bearing) of a shaft bearing point.

FIG. 1 shows in cross-section a machine housing wall 2 in which a bearing pot 16 is inserted for receiving a radial shaft bearing (not shown in this figure). The drive shaft 1 is mounted rotatably about the rotational axis 8 and extends in the axial direction 6. The bearing pot 16 has a chamber partition wall 12 which divides the lubricant chamber into a seal chamber 14 and a bearing chamber 13, wherein the two chambers 13, 14 are connected together fluid-conductively by the partition wall choke 15. The partition wall choke 15 is formed by an annular gap which results between the chamber partition wall 12 and the drive shaft 1, in particular the drive shaft choke diameter 19. The drive shaft choke diameter 19 diminishes in the axial direction 6, from left to right in the illustration of FIG. 1, i.e. the drive shaft 1 here has a conical form.

The annular gap between the chamber partition wall 12 and drive shaft 1 has a through-flow height 21 in the radial direction 7, wherein this height changes on longitudinal extension of the drive shaft 1 (which is conical in this region), provided that a fixed bearing is provided for mounting the drive shaft 1 and that said fixed bearing is arranged to the left of the bearing pot 16 in the illustration of FIG. 1 and spaced therefrom. Furthermore, the lubricant space 4 is sealed against the lubricant-free space 5 by means of the radial shaft sealing ring 11. The choke orifice 16 has a longitudinal extent 17, wherein the longitudinal extent 17 of the choke orifice 16 may be regarded as the wall thickness of the chamber partition wall 12 lying against the drive shaft.

In general, it is found that the small longitudinal extent 17 of the choke orifice 16 may lead to a further reduction in friction, in particular fluidic friction between the chamber partition wall 12 and the drive shaft 1.

The choke orifice 16 has the choke orifice inner diameter 20, and the drive shaft 1 has the drive shaft bearing diameter for receiving the radial shaft bearing, which is thus also received in the bearing pot 16. Furthermore, the drive shaft 1 has the drive shaft seal diameter 22, wherein this is configured such that the radial shaft sealing ring 11 runs on this diameter 22 and thus seals the lubricant space 4 from the lubricant-free space 5.

Figure 2:
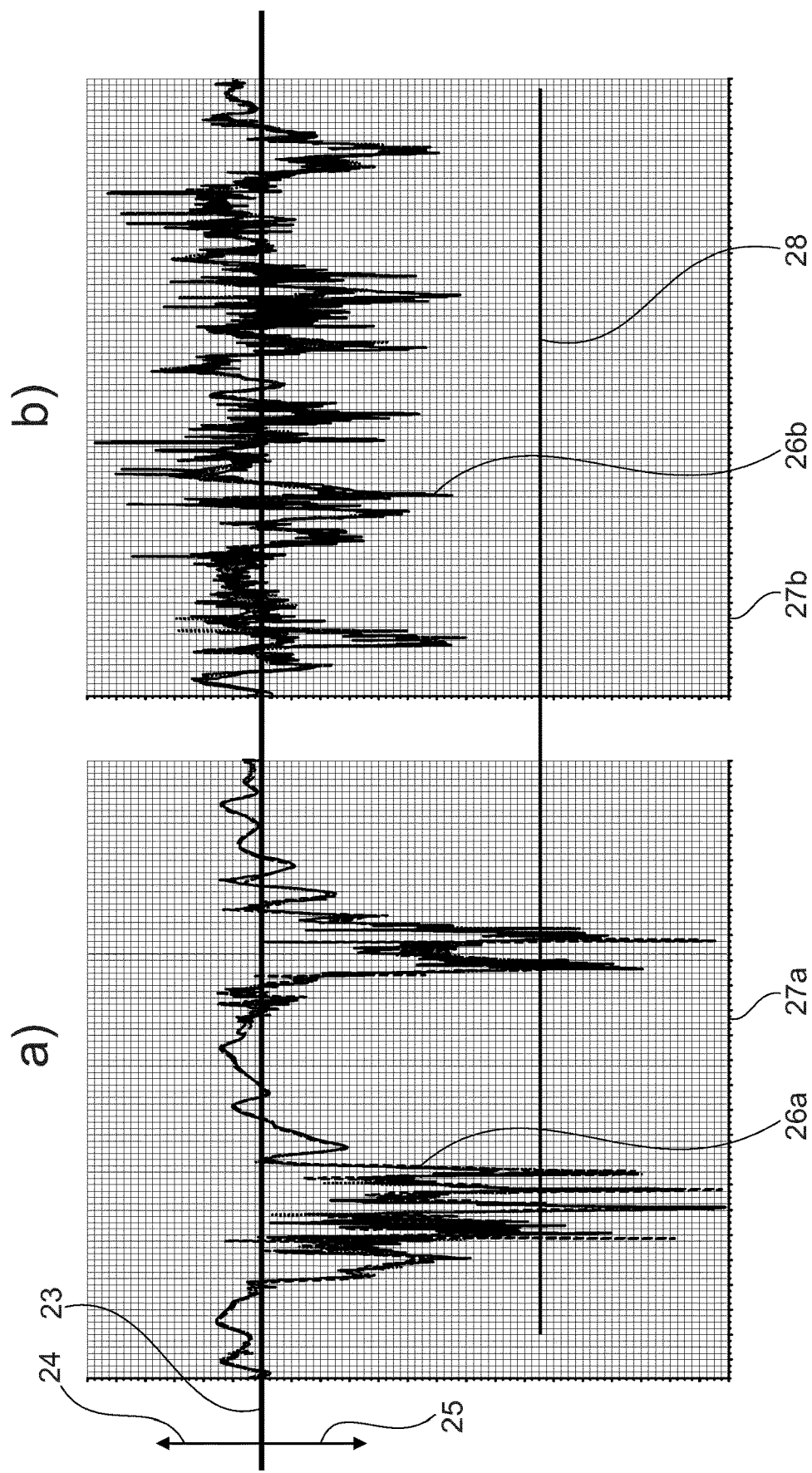
FIG. 2 is pressure curves with/without chamber partition wall in the seal chamber.

FIG. 2 shows two qualitative pressure curves for alternate operation, with respect to the rotation speed of the drive shaft 1, wherein the pressure curves 26a, 26b shown each relate to the pressure acting on the radial shaft seal. Positive pressure 24 is shown in the illustration above from the center line 23 (atmospheric pressure), and negative (below atmospheric) pressure 25 is accordingly shown below this. The pressure curve 26a is shown over the time 27a, wherein it is clear that rotation speed variations at the drive shaft 1 lead to pressure fluctuations in the space between the radial shaft bearing 3 and the radial shaft seal 11.

FIGS. 2a and 2b show the same operating states, but FIG. 2a illustrates the pressure curve 26a for a shaft bearing point without partition wall choke 15; or in other words, pressure fluctuations, which may result in particular from a pump effect of the radial shaft bearing 3, act directly on the radial shaft seal 11. FIG. 2b however shows the same operating states as FIG. 2a but for the proposed shaft bearing point with partition wall choke, via which the bearing chamber is fluidically connected to the seal chamber but with the choking effect of the partition wall choke; in other words, pressure fluctuations in the bearing chamber here only act indirectly on the radial shaft seal 11, which is evident in particular from the reduced negative pressure values of the pressure curve 26b in comparison with 26a.

Depending on the preload of the radial shaft seal 11, there is a critical negative pressure limit 28. The critical negative pressure limit represents the negative pressure which may cause the radial shaft seal 11 to lift away from the drive shaft. If the radial shaft seal 11 lifts away from the drive shaft 1, despite the negative pressure situation, fluid may escape from the lubricant space 4 to the lubricant-free space 5.

It is clear from FIGS. 2a and 2b that the partition wall choke 15 reduces the negative pressure acting on the radial shaft seal in comparison with an arrangement without partition wall choke, so that a radial shaft seal with lower preload may be used than without partition wall choke, without loss of operating reliability. The invention leads thus to a not inconsiderable reduction in friction level at the radial shaft seal and hence to an increase in efficiency of a drive system comprising a shaft bearing point of the proposed type, in comparison with a conventional shaft bearing without partition wall choke.

Figure 3:
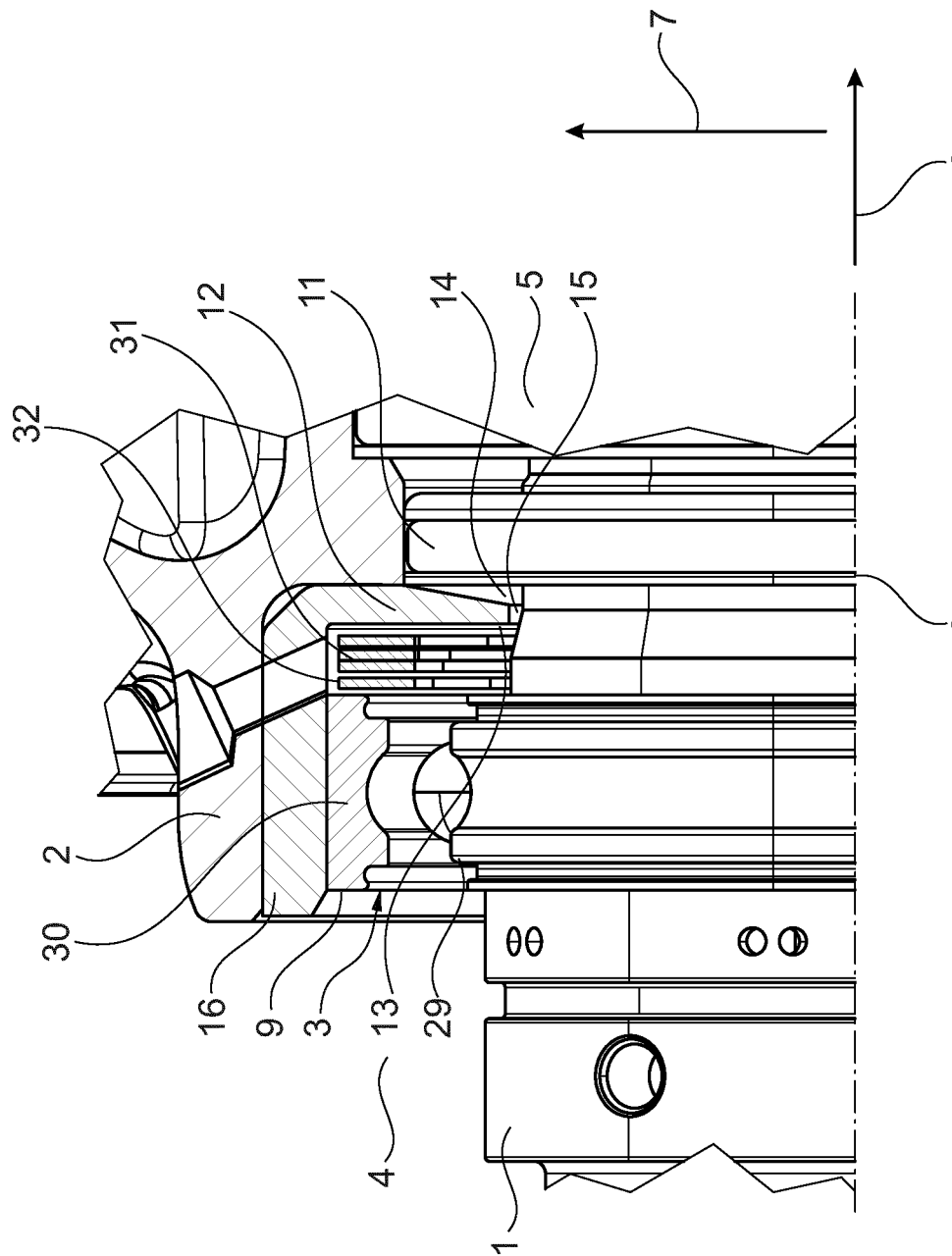
FIG. 3 shows a part-sectional illustration of the shaft bearing point.

FIG. 3 shows a further part-sectional illustration of the proposed bearing shaft point. The drive shaft 1 is mounted rotatably about the rotational axis 8 relative to the machine housing wall 2 via the radial shaft bearing 3. The radial shaft bearing 3 is received indirectly in the machine housing wall 2 via the bearing pot 16, and configured as a deep-groove ball bearing with a bearing outer ring configured as an outer bearing ring 30, and a bearing inner ring 29. Via the bearing inner ring 29, the radial shaft bearing 3 sits on the drive shaft bearing diameter and is fixed in the axial direction 6 on the drive shaft 1. The bearing outer ring is received displaceably in the axial direction 6 in the bearing pot 16, wherein by means of a spring bearing device 31, a preload force is exerted thereon, in particular on the end facing the radial shaft seal 11, the so-called seal side 32. On the end facing away from the spring bearing device 31, the radial shaft bearing 3 has the lubricant side 9 which faces the lubricant space 4.

The chamber partition wall 12 of the bearing pot 16 divides the space lying between the seal side 32 and the radial shaft seal 11, the so-called lubricant chamber, into the bearing chamber 13 and the seal chamber 14, wherein the two chambers 13, 14 are connected together fluid-conductively but choked via the partition wall choke 15. The partition wall choke 15 has a through-flow annular gap formed between the drive shaft 1 and the chamber partition wall 12, with a height extent orthogonally to the rotational axis 8, i.e. in the radial direction 7.

In particular, because of the partition wall choke 15 and its proposed configuration or height in the radial direction 7 and longitudinal extent in the axial direction 6, it can be achieved that pressure changes which may result from alternating operation of the drive shaft 1 and occur in the bearing chamber 13, are not directly reflected in the seal chamber 14. In particular, the negative pressure fluctuations from the alternating operation of the drive shaft 1 are alleviated in the bearing chamber, and thus a radial shaft seal 11, in particular a radial shaft sealing ring, with "smaller" preload may be used without deterioration in the seal effect against the lubricant-free space 5.

The invention claimed is:

1. A shaft bearing point, comprising:
    a radial shaft bearing in which a drive shaft is rotatably supportable relative to a machine housing,
    wherein the radial shaft bearing is arrangeable directly or indirectly in a machine housing wall which separates a lubricant space from a lubricant-free space,
    wherein in an axial direction, the radial shaft bearing has a lubricant side facing the lubricant space, and a seal side facing away from the lubricant space;
    a radial shaft sealing ring is arranged axially spaced from the seal side of the radial shaft bearing such that, in the axial direction, a lubricant chamber is created between the seal side and the radial shaft sealing ring; and
    a chamber partition wall arranged in the lubricant chamber,
        wherein the chamber partition wall divides the lubricant chamber into a bearing chamber, which is arranged between the seal side and the chamber partition wall, and a seal chamber, which is arranged between the chamber partition wall and the radial shaft sealing ring, and
    wherein the bearing chamber and the seal chamber are connected together fluid-conductively via a partition wall choke,
    wherein the partition wall choke comprises an annular gap as a fluid-conductive connection between the bearing chamber and the seal chamber, said annular gap being formable between the chamber partition wall and the drive shaft and having a through-flow height greater than 0.1 mm and less than 3 mm in a radial direction.

2. The shaft bearing point as claimed in claim 1, further comprising:
    a bearing pot in which the radial shaft bearing is received, the bearing pot radially surrounding the radial shaft bearing, and
    the chamber partition wall is formed integrally with said bearing pot.

3. The shaft bearing point as claimed in claim 1, wherein the chamber partition wall has a choke orifice radially opposite the drive shaft, and
    in a region lying against the drive shaft, the choke orifice has an axial longitudinal extent which is greater than 0.25 mm and less than 5 mm.

4. The shaft bearing point as claimed in claim 1, further comprising:
    a spring bearing arranged in the axial direction between the seal side and the chamber partition wall, wherein the spring bearing applies a bearing preload force in the axial direction onto an outer bearing ring of the radial shaft bearing, and
    the radial shaft bearing is displaceable in the axial direction relative to the machine housing wall.

5. The shaft bearing point as claimed in claim 1, wherein the drive shaft has a drive shaft bearing diameter for receiving the radial shaft bearing,
    the drive shaft has a drive shaft choke diameter opposite the chamber partition wall, and
    the drive shaft choke diameter is less than the drive shaft bearing diameter.

6. The shaft bearing point as claimed in claim 5, wherein the choke orifice has a choke orifice inner diameter, and
    the choke orifice inner diameter is selected from a diameter range relative to the drive shaft bearing diameter, and said range extends from 1 mm smaller than the drive shaft bearing diameter up to 1 mm larger than the drive shaft bearing diameter.

7. A shaft bearing, comprising:
    first and second radial bearing points, wherein
        at least one of the first and second radial bearing points comprising:
        a radial bearing in which a drive shaft is rotatably supportable relative to a machine housing,
            wherein the radial bearing is arrangeable directly or indirectly in a machine housing wall which separates a lubricant space from a lubricant-free space,
            wherein in an axial direction, the radial bearing has a lubricant side facing the lubricant space, and a seal side facing away from the lubricant space;
            a radial sealing ring is arranged axially spaced from the seal side of the radial bearing such that, in the axial direction, a lubricant chamber is created between the seal side and the radial sealing ring; and a chamber partition wall arranged in the lubricant chamber, wherein the chamber partition wall divides the lubricant chamber into a bearing chamber, which is arranged between the seal side and the chamber partition wall, and a seal chamber, which is arranged between the chamber partition wall and the radial shaft sealing ring, and wherein the bearing chamber and the seal chamber are connected together fluid-conductively via a partition wall choke, wherein the partition wall choke comprises an annular gap as a fluid-conductive connection between the bearing chamber and the seal chamber, said annular gap being formable between the chamber partition wall and the drive shaft and having a through-flow height greater than 0.1 mm and less than 3 mm in a radial direction.

8. The shaft bearing point as claimed in claim 7, wherein one of the first and second radial bearing points is configured as a fixed bearing point so that the drive shaft is fixed in the axial direction in the fixed bearing point, and the other of the first and second radial bearing points is configured as a shaft bearing point, and the fixed bearing point is arranged in the axial direction on the lubricant space side of the radial shaft bearing and axially spaced therefrom.

\* \* \* \* \*